United States Patent Office 3,431,127
Patented Mar. 4, 1969

3,431,127
PROCESS OF IMPROVING THE ANTI-BLOCKING CHARACTERISTICS OF REGENERATED CELLULOSE TUBING AND THE PRODUCT RESULTING FROM SAID PROCESS
Robert J. Baetzel, Chicago Heights, and Henry Majewski, Chicago, Ill., assignors to Union Carbide Corporation, a corporation of New York
No Drawing. Continuation of application Ser. No. 308,365, Sept. 12, 1963. This application May 15, 1967, Ser. No. 638,664
U.S. Cl. 106—168       13 Claims
Int. Cl. C08b 21/20, 21/00; C09k 3/00

ABSTRACT OF THE DISCLOSURE

By dispersing a fatty acid partial ester of a polyhydric alcohol into a viscose solution, a regenerated cellulosic tubing can be obtained which exhibits substantially improved anti-blocking characteristics.

---

This application is a continuation of prior application Ser. No. 308,365 filed Sept. 12, 1963 now abandoned.

This invention relates to cellulosic structures and method of making same. More particularly, it relates to regenerated cellulose tubing especially useful as sausage casings.

Sausage products such as bologna are commonly stuffed in synthetic or artifical and preferably in cellulosic sausage casings. These casings are shipped to the sausage maker by the casing manufacturer as flattened tubings of desired length and diameter. Before stuffing the casing with meat emulsion, the sausage makers first make a closure at one end of the casing. The closure in the dry casing is usually made by first gathering, as in pleating, one end of the flattened casing and then tying the gathering with cord or twine or applying one of the several types of commercial eyelets or metal closure clips. Also, a length of cord or twine can be attached to this end for hanging the stuffed casing.

The gathering and closure of one end of cellulosic sausage casings can be done on one of several semi-automatic tying or gathering closure machine commercially sold for the purpose, or may be done manually.

When done in an automatic machine, it is necessary that the machine be properly adjusted for the width of casing being tied and that the casing be accurately centered therein. Before mechanical gathering, it is preferred that the casing be moisture-conditioned to enhance its pliability.

When automatic twine-tying equipment is used, it must be adjusted so that the twine is not pulled too tightly into the casing, thereby weakening or cutting the casing wall. If these conditions are not observed, the gathering closure operation can seriously damage the casing and thus adversely affect the strength of the tie closure.

Furthermore, there is a trend toward stuffing longer lengths of casing to improve automatic slicing efficiency in a subsequent slice-packaging operation. Unit sausage weights of 20 to 25 pounds and lengths of four feet are not uncommon. Such heavy unit weights place a considerable strain on the casing about the tie and hanger loop throughout the sausage processing steps.

A condition frequently exists in regenerated cellulose tubing used for food casings in which the inner wall surfaces of the flattened tubing adhere to each other. It is not fully understood why this occurs but, it is believed that this condition is caused by the relatively high moisture and softener content required in commercial regenerated cellulose tubing and sheet to make the film flexible at all relative humidities to which the film will be exposed in its end use. This condition, referred to as "blocking," is generally aggravated by prolonged storage of the flattened tubing on a reel or in sheets, if they are in intimate contact. This blocked condition adversely affects the performance of the tubing, particularly in its end use in the food industry, when mechanical tying equipment is employed to make an initial closure on the dry tubing for use as a food package. The blocked tubing exhibits a higher degree of stiffness than unblocked tubing, thus resisting bending and folding in the pleating operation of the tying machine, which results in damage to the film, or slows the tying operation. Other factors which it is believed result in damage to the film during the pleating operation are the high frictional force between the outer surfaces of the flattened tubing and the metal pleater bars, and the friction between the internal casing surfaces, both of which tend to prevent relief of the stress applied to the tubing during the pleating operation.

An object of this invention is to produce a cellulosic casing having improved anti-blocking characteristics.

Another object of this invention is to provide a method of producing a cellulosic sausage casing having incorporated therein an anti-blocking and slip agent and the casing so produced.

Other and additional objects will become apparent from the following description.

In accordance with one embodiment of the present invention, it has been found that the incorporation of a fatty acid partial ester of a polyhydric alcohol and a fat forming fatty acid, said ester containing at least one free hydroxyl group, into viscose and thereafter forming a regenerated cellulosic tubing therefrom unexpectedly results in reduction of the "blocking" tendency and in reduction of the slip resistance of the cellulosic tubing both on the internal and external surfaces.

In the preferred practice of the invention the fatty acid partial ester is homogeneously incorporated into a cellulosic solution and the cellulose structure containing the fatty acid partial ester in situ is regenerated from said solution. In the embodiment where the cellulosic solution is viscose, the preferred point of addition of the fatty acid partial ester into the viscose is after the final filtration of the viscose, before it is extruded to form the regenerated cellulose film. This avoids the removal of any of the fatty acid partial ester by the filtering media employed. The regenerated cellulose film containing the fatty acid partial ester in situ is then cast from the viscose in the usual manner, washed, desulfured and then led through an aqueous softening bath containing glycerin. The cellulosic structure is then dried in the usual manner.

The invention will be more readily understood from the following examples wherein the parts and percentages are given by weight unless otherwise indicated.

In the examples, the indicated concentrations of the fatty acid partial ester were incorporated into the viscose after the final filtration and prior to extrusion. The viscose containing the fatty acid partial ester was then extruded in a conventional manner through an annular orifice into a regenerating and coagulating aquarium to form tubular gel film. The film was further regenerated, washed and desulfured. The regenerated film containing the fatty acid partial ester homogeneously incorporated therein was then plasticized by immersing it in an aqueous glycerin solution and then dried in the inflated state.

The tying performance of the cellulosic tubing was evaluated on the Hercules Fastie machine which is comprised of a jaw having two spaced sets of metallic blades positioned to interleave when in the closed position. One flat end of the casing is positioned in the jaw of the machine and the jaw closed. The interleaved blades force the casing to form a tight sinuous path resulting in a pleated casing. The pleated casing is gathered and tied with string or inserted into a clipping device which positions a clip about the pleated section.

This machine is a common piece of equipment employed in the meat packing industry for making the initial closure on dry regenerated cellulose tubing to be used for a food package. This machine was selected, for test purposes, over other contemporary tying machines employed in the trade because of the higher stress-strain forces developed in the tubing pleating operation caused by the high speed action of the pleating mechanism.

The slip resistance test is a measurement of the frictional force required to move a metal surface over the tubing outer surface, or vice versa, and the force required to slide the tubing's inner surfaces over each other. The force is expressed as Slip Resistance in grams as measured on a spring tension gauge.

The test equipment and procedure is as follows:

A flat platform on wheels is pulled on a track, by an electric motor, at a constant rate of speed. The tubing surface to be tested is fastened to the platform and a 454 gram metal block is placed on top of the tubing. The metal block is connected by a string or wire to a stationary tension gauge. As the platform moves, the resistance of the metal to slipping over the tubing surface is indicated on the tension gauge and is reported as slip resistance expressed in grams. For measuring the slip resistance of one tubing surface to another, the metal block is wrapped in one of the tubings with the inner surface exposed before placing it on the tubing (inner surface exposed) fastened to the movable platform.

The blocking test and evaluation of the tubing in its flattened state is accomplished by visual inspection and attempting to separate, by hand, the tubing's inner surfaces. No attempt is made to define the degree of blocking that may exist in the tubing. If the inner surfaces adhere to each other, the tubing is blocked; if the inner surfaces do not adhere to each other, the tubing is unblocked.

concentration of fatty acid partial ester were tested for slip resistance of the tubing to metal and the results of this test are presented in Table I. Samples of the tubing containing 0.0 percent and 1.0 percent ester were tested for tying performance on the Hercules Fastie machine and results of this test are also presented in Table I, in which the reduction in breakage of the casing can be noted.

TABLE I

| Fatty Acid Partial Ester, percent by weight of cellulose | Slip Resistance (g.) at 31% Relative Humidity Outer Surface to Metal | Tying Performance at 12% Relative Humidity, Percent Breaks |
| --- | --- | --- |
| 0.0 | 107 | 22.1 |
| 0.5 | 81 | — |
| 1.0 | 75 | 1.2 |
| 3.5 | 76 | — |

—Means no test.

EXAMPLE II

A 5% aqueous dispersion of glyceryl monostearate was metered into viscose, at a rate to give 0.5 percent fatty acid partial ester to bone dry cellulose in the regenerated cellulose tubing by the method described in Example I. The glycerin softener content of the tubing, 3.8 mils in thickness and 6.75 inches in flat width, was varied from 13 to 50 percent in order to demonstrate that the improvement in slip characteristics of the film can permit reduction in the amount of glycerin otherwise required to prevent film damage. The slip resistance of the resulting tubings and the tying performance are summarized in Table II. It is apparent from these data that the improvement in slip properties of the film containing the glyceryl monostearate can permit a 10% reduction in glycerine content from the level of approximately 50 to 40 percent or from a level of 40 to 30 percent, while retaining the level of resistance to breakage at low relative humidity exhibited by the respective higher glycerin content tubing which does not contain the slip additive. The reduction in glycerin content of the tubing results in a substantial reduction in manufacturing cost. Also, the reduction in glycerin content contributes to the improvement of anti-blocking properties.

TABLE II

| Concentration of Ester in Tubing (Percent Ester to Cellulose) | Concentration of Softener in Tubing (Percent Glycerine to Cellulose) | Slip Resistance (g.) | | Tying Performance 9% Relative Humidity Breaks (Percent) |
| --- | --- | --- | --- | --- |
| | | Outer Surface to Metal | Inner Surface to Inner Surface | |
| 0 | 51.0 | 120 | 245 | 9 |
| 0.5 | 49.4 | 98 | 135 | 1 |
| 0 | 40.0 | 120 | 270 | 29 |
| 0.5 | 40.5 | 97 | 150 | 8 |
| 0 | 31.7 | 120 | 315 | 54 |
| 0.5 | 32.8 | 94 | 200 | 23 |
| 0 | 23.4 | 115 | 300 | 93 |
| 0.5 | 24.2 | 90 | 230 | 59 |
| 0 | 12.8 | 126 | 275 | 82 |
| 0.5 | 13.7 | 85 | 200 | 72 |

EXAMPLE I

In this example a commercial grade of a fatty acid partial ester, glyceryl monostearate, was used. The glyceryl monostearate contained minor amounts of the di and tri esters. A 5% solids aqueous dispersion of the partial ester was continuously admixed into the viscose after the final filtration of the viscose but before the extrusion thereof into regenerated cellulose tubing. The rate of addition of the glyceryl monostearate to the viscose was controlled to result in the indicated concentrations in the film. The cellulosic tubings 6.25 inches in flat width and 3.6 mils in thickness, were continuously formed, regenerated, washed, desulfured, plasticized and then dried by a method known and readily apparent to those skilled in the art. The cellulosic tubings were plasticized with glycerine to a level of 36 percent of glycerine to dry cellulose by weight. Samples of the tubing containing the various levels of

EXAMPLE III

An aqueous dispersion of glyceryl monostearate was metered into the viscose at a rate to give 0.50, 0.43, 0.35, 0.26, 0.18 and 0.09 percent ester to bone dry cellulose in the regenerated cellulose tubing by the method described in Example I. The slip resistance of this tubing 2.40 mils in thickness and 8.6 inches in flat width was measured and the results of this test are presented in Table III. A partial reel of each of these tubings was set aside for evaluation of the development of blocking during storage. The results of this storage test are presented in Table III. It is apparent from this data that the optimum additive content of the film to provide protection against the development of blocking for a storage interval of at least 60 days is in the range of 0.4 to 0.5 percent.

TABLE III

| Concentration of Ester in Tubing (Percent Ester to Cellulose) | Slip Resistance (g.) at 24% R.H. | | Storage Condition on Reel | | |
|---|---|---|---|---|---|
| | Outer Surface to Metal | Inner Surface to Inner Surface | 0 days | 5 days | 60 days |
| 0 | 100 | 428 | Unblocked | Blocked | |
| 0.09 | 101 | 367 | do | do | |
| 0.18 | 92 | 359 | do | do | |
| 0.26 | 90 | 219 | do | do | |
| 0.35 | 91 | 200 | do | do | |
| 0.43 | 83 | 132 | do | Unblocked | Unblocked. |
| 0.50 | 81 | 127 | do | do | Do. |

EXAMPLE IV

An aqueous dispersion of diglycol stearate was metered into viscose at a rate to give 0.5 percent ester to to the bone dry cellulose of the regenerated cellulose tubing of the dimensions and by the method described in Example I. The slip resistance of this tubing was measured and the results of this test are presented in Table IV. Tying performance of this casing was evaluated on the Hercules Fastie machine and the results of this test are also presented in Table IV. The ester-containing tubing remained unblocked after 60 days of reel storage while control tubing blocked after one day of reel storage.

TABLE IV

| Concentration of Ester in Tubing (Percent Ester to Cellulose) | Slip Resistance (g.) at 18% R.H. | | Tying Performance at 12% R.H. Breaks, Percent |
|---|---|---|---|
| | Outer Surface to Metal | Inner Surface to Inner Surface | |
| 0 | 117 | 507 | 14.7 |
| 0.5 | 82 | 227 | 6.0 |

EXAMPLE V

An aqueous dispersion of glyceryl monolaurate was metered into viscose at a rate to give 0.5 percent ester to cellulose in the regenerated cellulose tubing of the dimensions and by the method described in Example I. The slip resistance of this tubing was measured and the results of this test are presented in Table V. Tying performance of this tubing was evaluated on the Hercules Fastie machine and the results of this test are also presented in Table V.

TABLE V

| Concentration of Ester in Tubing (Percent Ester to Cellulose) | Slip Resistance (g.) at 18% R.H. | | Tying Performance at 12% R.H. Breaks, Percent |
|---|---|---|---|
| | Outer Surface to Metal | Inner Surface to Inner Surface | |
| 0 | 106 | 300 | 30.0 |
| 0.5 | 94 | 97 | 8.0 |

EXAMPLE VI

An aqueous dispersion of glyceryl monooleate was metered into viscose at a rate to give 1.0 percent ester to cellulose in the regenerated cellulose tubing of the dimensions and by the method described in Example I. The slip resistance of this tubing was measured and the results of this test are presented in Table VI. Tying performance of this tubing was evaluated on the Hercules Fastie machine and the results of this test are presented in Table VI.

TABLE VI

| Concentration of Ester in Tubing (Percent Ester to Cellulose) | Slip Resistance (g.) at 18% R.H. | | Tying Performance at 12% R.H. Breaks, Percent |
|---|---|---|---|
| | Outer Surface to Metal | Inner Surface to Inner Surface | |
| 0 | 106 | 300 | 30.0 |
| 1.0 | 93 | 124 | 4.0 |

EXAMPLE VII

An aqueous dispersion of propylene glycol monostearate was metered into viscose at a rate to give 0.5 percent ester to cellulose in the regenerated cellulose tubing of the dimensions and by the method described in Example I. The slip resistance of this tubing was measured and the results of this test are presented in Table VII. Tying performance of this tubing was evaluated on the Hercules Fastie machine and the results of this test are presented in Table VII.

TABLE VII

| Concentration of Ester in Tubing (Percent Ester to Cellulose) | Slip Resistance (g.) at 18% R.H. | | Tying Performance at 12% R.H. Breaks, Percent |
|---|---|---|---|
| | Outer Surface to Metal | Inner Surface to Inner Surface | |
| 0 | 106 | 300 | 30.0 |
| 0.5 | 93 | 104 | 10.0 |

EXAMPLES VIII–XII

In these examples, regenerated cellulosic tubings 3.8 mils in thickness and 6.75 inches in flat width were made as in Example I. A five percent solids aqueous dispersion of the indicated fatty acid partial ester was metered into the viscose at a rate to give 0.5 percent partial ester to cellulose in the regenerated cellulosic tubing. The tying performance and slip resistance of the tubing is given in Table VIII.

TABLE VIII

| Ex. | Ester | Tying Performance at 14% R.H. Breaks, percent | Slip Resistance at 14% R.H. | |
|---|---|---|---|---|
| | | | Outer Surface to Metal | Inner Surface to Inner Surface |
| VIII | Control casing | 6 | 116 | 322 |
| IX | Glyceryl monoester of safflower oil | 2 | 93 | 132 |
| X | Glyceryl monoester of coconut oil | 1 | 96 | 163 |
| XI | Glyceryl monester of lard | 0 | 92 | 127 |
| XII | Glyceryl monoester of mixture of oleic and stearic acids. | 0 | 89 | 127 |

EXAMPLE XIII

An aqueous dispersion of glyceryl distearate was metered into viscose at a rate to give 0.5 percent ester to cellulose in the regenerated cellulose tubing of the dimensions and by the method described in Example I. The tying performance and slip resistance are given in Table XIII.

TABLE XIII

| Concentration of Ester in Tubing (Percent Ester to Cellulose) | Slip Resistance (g.) at 18% R.H. | | Tying Performance at 12% R.H. Breaks, Percent |
|---|---|---|---|
| | Outer Surface to Metal | Inner Surface to Inner Surface | |
| 0.0 | 109 | 340 | 35 |
| 0.5 | 91 | 139 | 0 |

EXAMPLE XIV

A 5 percent aqueous dispersion of glyceryl monostearate was metered into viscose to produce the indicated concentration in the regenerated cellulosic tubing having a flat width of 8.6 inches and a film thickness of 2.4 mils by the method of Example I. The surface of the film was subjected to an abrading action of a Tabar Abradér for 25 revolutions of the machine. The films were then observed for wear and given ratings of 1 (best) to 4.

TABLE XIV

| Concentration on glyceryl monostearate in film: | Rating on Tabar Abradér 25 revolutions |
|---|---|
| 0.0 | 4 |
| 0.18 | 3 |
| 0.35 | 2 |
| 0.50 | (best) 1 |

The fatty acid partial esters that can be used in this invention are those esters of polyhydric alcohols and fat forming fatty acids containing one or more free hydroxyl groups.

The esters may be in their pure state or in the form of their technical grades available on the market in the form of liquids, oils, soft masses of firm masses. The esters may have a single fatty acid or may have a mixture of fatty acids such as are obtained from the fish and vegetable oils or the animal fats.

The term "fatty acid" as herein used is definitive of those fat forming fatty acids present as such or as glycerides in natural fats. The Yearbook of Agriculture, 1959 Food, U.S. Department of Agriculture, p. 716, defines "fat" as follows:

"A glyceryl ester of fatty acids. Fats generally are substances of plant and animal origin. Fat may be in solid form, as butter, margarine, or other shortening, or in liquid form, as the vegetable oils."

Preferably such acids contain from 8 to 22 carbon atoms and may be saturated or unsaturated such as stearic, oleic, myristic, lauric, behenic, etc., and mixtures thereof. The saturated fatty acids are preferred, since they do not readily oxidize and become rancid. The alcohols used to form the esters are the polyhydric alcohols such as diethylene glycol, propylene glycol, polyoxyethylene glycols, glycerol, sorbitol, mannitol and the like.

In general, the commercially available fatty acid partial esters, such as glyceryl monostearate, are mixtures of the mono-, di- and some tri-esters, and traces of the fatty acids. The monoglyceride being present in a major proportion. The commercial products also contain traces of preservatives, such as 1/100 of 1 percent by weight of butylated hydroxy anisole, 1/100 of 1 percent by weight of citric acid in a propylene glycol carrier added as preservatives. Commercially available products generally will also contain small traces of free glycerin, generally less than 1.5 percent, and small traces of free fatty acids, generally less than 0.5 percent.

The fatty acid partial esters can be incorporated into the cellulosic solution at any convenient point. The incorporation of the fatty acid partial ester into the viscose, as described in the examples, is accomplished by separately metering viscose and the fatty acid partial ester into a continuous mixing device and then extruding the homogeneous mixture of fatty acid partial ester containing viscose in the usual manner used to produce a regenerated cellulose sausage casing or tubing.

The physical form of the fatty acid partial ester used is one which will readily mix with and be homogeneously dispersed in the cellulosic solution. In the embodiment wherein the fatty acid partial ester is dispersed in viscose, the "oil" type of ester can be dispersed as is, or can be made into an aqueous dispersion which is then added to the viscose. The solid fatty acid partial esters are added in the form of an aqueous dispersion employing either a self-emulsifying type of fatty acid partial ester which contains small amounts of the potassium salt of the fatty acid forming the ester as the dispersing agent, or a nonself-emulsifying type to which a dispersing agent has been added.

In the embodiment wherein the ester is added to viscose and the sodium salt of the fatty acid is insoluble in the viscose such as occurs when using glyceryl monostearate, the amount of potassium salt of the fatty acid as well as the amount of free fatty acid, present in the dispersion of the ester should be maintained at the lowest possible effective level to minimize formation of insoluble sodium stearate after admixture with the viscose.

The water dispersion of the ester should be as concentrated as is consistent with good mixing. For example, dispersions containing the ester in concentrations of 5 to 10 percent ester, with approximately 0.3 to 0.6 percent potassium salt of the fatty acid of said ester can be used.

In the embodiment wherein cellulosic sausage casings are made by the viscose process, the preferred point of addition of the ester to the viscose is after the final viscose filtration has been performed to avoid removal of any part or all of the ester by the filtering media employed.

As is apparent from the data in the following Table XV, wherein glyceryl monostearate was admixed with viscose, the rate of saponification of the fatty acid ester in alkali at 25° C. is slow, and negligible up to a period of approximately two hours. After twenty-one hours, approximately 20 percent of the ester is saponified. This sodium hydroxide consumption agrees well with the number of particles (sodium stearate) filtered from viscose on an 80 mesh screen after similar holding periods.

TABLE XV

| Time | Temp. (° C.) | NaOH Consumed ᵃ (mg.) | Glycerol Monostearate Saponified (Percent) | Number of Particles Retained on 80 Mesh Screen ᵇ |
|---|---|---|---|---|
| 10 min | 25 | 14 | | |
| 20 min | 25 | 14 | | |
| 30 min | 25 | 14 | | 10 |
| 2 hrs | 25 | 22 | 0.42 | 22 |
| 3 hrs | 25 | 30 | 6.0 | |
| 4 hrs | 25 | 36 | 10.2 | 43 |
| 21 hrs | 25 | 50 | 20.0 | 48 |

ᵃ Includes NaOH required to react with free fatty acid to sample (theoretical=21.4 mg.).
ᵇ From one liter of viscose.

While this data indicates that extensive holding periods of the ester-viscose mix can be employed, it is apparent that short holding periods (on the order of thirty minutes) will result in no saponification of the ester and few sodium stearate particles which ultimately cause operating problems.

The incorporation of the antiblocking fatty acid partial ester into the cellulosic structure by admixture with the cellulosic solution is preferred over other methods, such as coating the cellulosic structure with the fatty acid esters for several reasons. By incorporation of the ester into the cellulosic structure, the ester is more uniformly dispersed on the surface of the structure. In the embodiment wherein sheets, film or tubing are produced, both surfaces of the sheets and film, and in the tubing, both the inner and outer surfaces are affected. Thus, with one operation both sides effectively are treated with the antiblocking fatty acid ester. Also, it is generally believed that when the fatty ester is dispersed throughout the structure and some ester is removed from the surface, that which remains in the structure will migrate to the film surfaces. In this manner, the film remains anti-blocking, even upon removal of at least the initial portion of the antiblocking fatty acid ester which has migrated to the film surfaces. Also, when the cellulosic surface is abraded, a new surface is exposed which also contains the antiblocking and slip agent.

Another advantage to incorporation of the ester into the cellulosic structure such as by admixture with viscose is that in using a coating, a need to find an adequate solvent is present. Also, the coating operation necessitates using costly coating and solvent recovery equipment. Further, in the coating of tubing, an external coating operation as well as a costly and inefficient internal slugging operation to coat the inner surfaces is needed.

The antiblocking fatty acid partial ester of the present invention is incorporated into the cellulosic structure in a sufficient amount to impart improved anti-blocking properties to the structure and to improve the slip characteristics, and in a quantity which will not adversely affect the other normally desired physical characteristics of the structure produced. It has been found that if an excess amount of fatty acid partial ester is incorporated into cellulosic film there is a tendency for the film to become hazy. Also, at higher concentrations the rate of regeneration of the cellulose from viscose is reduced. Surprisingly, it has been found that the incorporation of the glyceryl monostearate into the casing improved the adhesion of alkyd inks to the cellulosic casing.

To impart good antiblocking properities to a cellulosic film of 0.75–4.25 mils thickness produced by the viscose process, it has been found that concentrations up to 3.5 percent of glyceryl monostearate to cellulose can be used without substantial impairment of the printability and other desirable characteristics of the film. The incorporation of 0.10 percent glyceryl monostearate into the film shows an improvement in the slip resistance and tying breakage of the film. Incorporation of the fatty acid ester into the film in concentrations greater than about 1.0 percent does not substantially further enhance the improvement in the desirable properities obtained.

In the manufacture of cellulosic tubing by the viscose process, fatty acid ester incorporated into the viscose just prior to extrusion, in a concentration of 0.4 percent to 1.0 percent by weight of ester to cellulose, has resulted in good antiblocking properties as well as reduced slip resistance on both inner and outer surfaces.

While the invention has been described for improving the slip and blocking properties of cellulosic tubing formed by the viscose process, the invention can also be used to improve the properties of regenerated cellulosic structures such as tubing, film, sheets, fibers, filaments, threads and the like prepared by the viscose process as well as other processes such as the cuprammonium, denitration of cellulose nitrate, deacetylation of cellulose acetate and the like.

A composition of the viscose that can be used is that generally employed in the art for making seamless regenerated cellulose tubing. Also, the compositions used for making sheet and rayon fibers and filaments can be used. A viscose of the following composition is particularly suitable for the making of cellulose tubing:

| | Percent |
|---|---|
| Cellulose | 6–8 |
| Caustic soda | 5–7 |
| Index | 28–50 |

The index value is the number of cubic centimeters of a 10 percent acetic acid solution required to gel 100 grams of viscose at room temperature.

The principles of this invention are applicable to known cellulose sausage casing constructions such as the casings prepared by annularly extruding and regenerating a viscose solution to form continuous cellulosic tubing including, but not restricted to, the casing described in U.S. Patents Nos. 1,601,686 and 1,612,509.

The sausage casing produced by the methods described herein are admirably suited for the use in processing and packaging of meat products such as sausage, salami, summer sausage, dry sausage, hams, Canadian bacon, butts, pork butts, picnic sausage, and the like. The casings can also be used for products other than meat products such as cheese and other food products which require processing or distribution in casings.

It will be obvious to those skilled in the art that various changes and modifications may be made in the described invention without departing from the nature and spirit of the invention.

What is claimed is:

1. A process for providing a regenerated cellulosic tubing which exhibits improved slip and anti-blocking characteristics, said process comprising dispersing a fatty acid partial ester of a polyhydric alcohol into a viscose solution after final filtration of said viscose solution, said fatty acid having from about 8 to 22 carbon atoms and said partial ester ocontaining at least one hydroxyl group; and forming and regenerating the viscose solution to form a regenerated cellulosic tubing wherein said fatty acid partial ester is incorporated therein in an amount of from about 0.1 percent to 1.0 percent by weight based on the dry weight of the cellulose in the tubing.

2. A process for providing a cellulosic tubing which exhibits improved slip and anti-blocking characteristics which process comprises dispersing in a viscose solution, after final filtration of said viscose solution, a fatty acid partial ester of a polyhydric alochol, said fatty acid having from about 8 to 22 carbon atoms and said partial ester containing at least one hydroxyl group; and thereafter forming and regenerating the viscose solution until a cellulosic tubing is obtained having said fatty acid partial ester incorporated therein in an amount of from about 0.1 percent to 1.0 percent by weight based on the dry weight of the cellulose in the tubing.

3. A process as in claim 2 wherein the fatty acid partial ester is glyceryl monostearate.

4. The process of claim 2 wherein the fatty acid partial ester is glyceryl monolaurate.

5. A process for providing a cellulosic tubing which exhibits improved slip and anti-blocking characteristics which process comprises dispersing into a viscose solution, after final filtration of said viscose solution, a fatty acid partial ester of a polyhydric alcohol, said fatty acid having from about 8 to 22 carbon atoms and said partial ester containing at least one hydroxyl group; and forming and regenerating the viscose solution to form a regenerated cellulosic tubing wherein said fatty acid partial ester is incorporated therein in an amount of from at least about 0.1 percent up to about 3.5 percent by weight based on the dry weight of the cellulose in the tubing but less than an amount which would reduce the rate of regeneration of said viscose solution.

6. A regenerated cellulosic tubing which contains a plasticizer and which tubing has incorporated therein a amount of from at least about 0.1 percent up to about 3.5 percent by weight based on the dry weight of the cellulose in the tubing but less than an amount which will cause said cellulosic tubing to become hazy, said fatty acid having from about 8 to 22 carbon atoms and said partial ester containing at least one hydroxyl group.

7. A regenerated cellulosic tubing having incorporated therein a fatty acid partial ester of a polyhydric alcohol in an amount of from about 0.1 percent to 1.0 percent by weight based on the dry weight of the cellulose in the tubing, said fatty acid having from about 8 to 22 carbon atoms and said partial ester containing at least one hydroxyl group.

8. A regenerated cellulose tubing having incorporated therein glyceryl monostearate in an amount of between about 0.1 to 1.0 percent by weight based on the dry weight of the cellulose in said tubing.

9. A regenerated cellulose tubing having incorporated therein glyceryl monolaurate in an amount of between about 0.1 to 1.0 percent by weight based on the dry weight of the cellulose in said tubing.

10. The process of claim 2 wherein the fatty acid partial ester is glycerol monooleate.

11. The process of claim 2 wherein the fatty acid partial ester is glycerol monomyristate.

12. A regenerated cellulose tubing having incorporated therein glycerol monooleate in an amount of from about 0.1 to 1.0 percent by weight based on the dry weight of the cellulose in said tubing.

13. A regenerated cellulose tubing having incorporated therein glycerol monomyristate in an amount of from about 0.1 to 1.0 percent by weight based on the dry weight of the cellulose in said tubing.

(References on following page)

References Cited

UNITED STATES PATENTS

| | | | |
|---|---|---|---|
| 2,095,129 | 10/1937 | Drew. | |
| 2,201,747 | 5/1940 | Staudt | 106—198 |
| 2,359,750 | 10/1944 | Collins | 106—164 |
| 2,476,976 | 7/1949 | Grunfeld et al. | 106—180 |
| 3,076,718 | 2/1963 | Gearhart et al. | 106—180 |
| 3,057,743 | 10/1962 | Touey et al. | 106—180 |

FOREIGN PATENTS

| | | |
|---|---|---|
| 531,497 | 1/1941 | Great Britain. |
| 146,912 | 6/1952 | Australia. |
| 798,192 | 7/1958 | Great Britain. |

ALLAN LIEBERMAN, *Primary Examiner.*

U.S. Cl. X.R.

99—176; 106—164